J. A. CAMERON.
MOVING PICTURE MACHINE.
APPLICATION FILED JAN. 8, 1912. RENEWED MAR. 14, 1919.
1,319,847.  Patented Oct. 28, 1919.
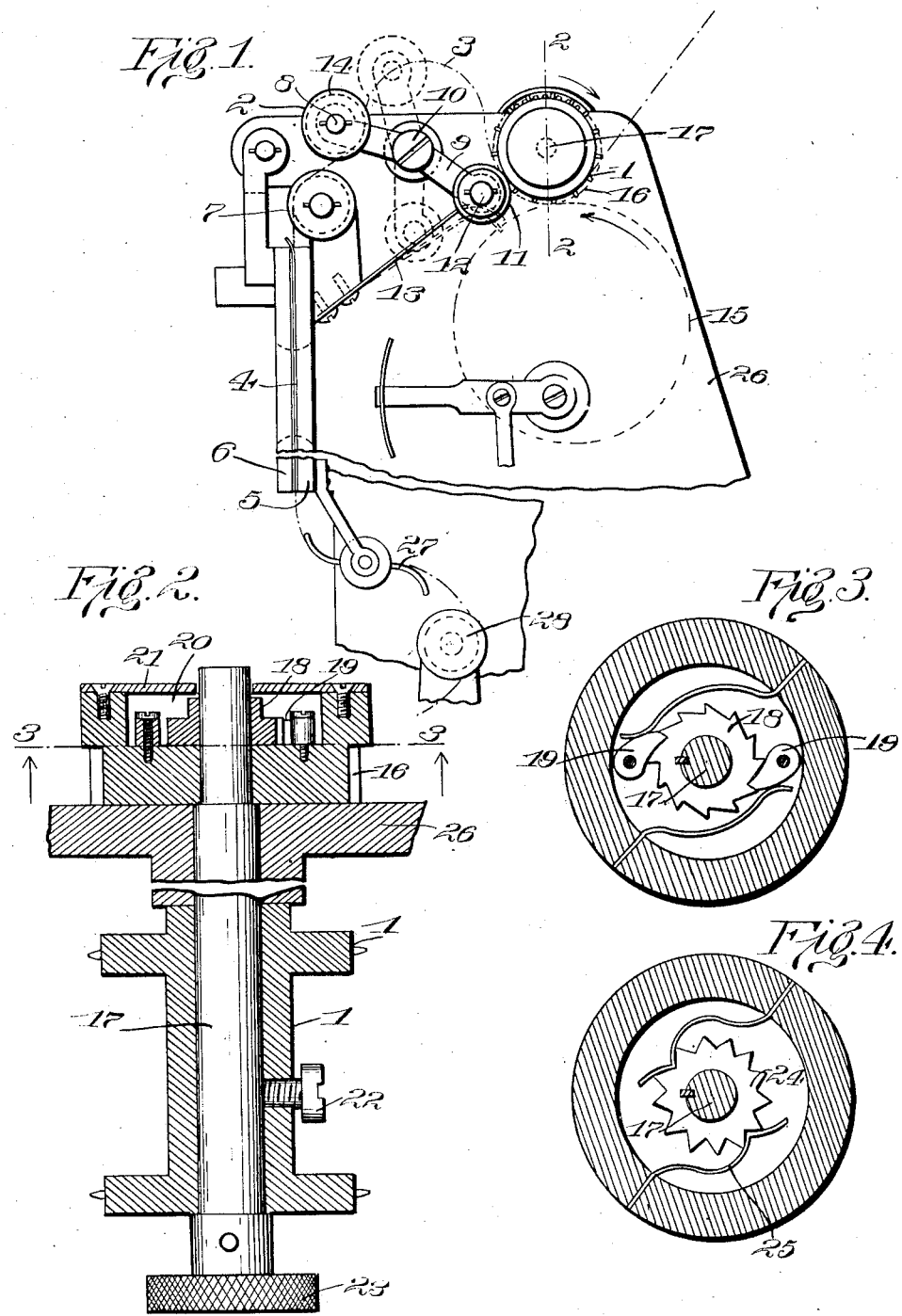
WITNESSES:
Philip S. McLean.
Vernon T. Houghton
INVENTOR
James A Cameron
BY
Brock Becker & Smith
ATTORNEYS

UNITED STATES PATENT OFFICE.

JAMES A. CAMERON, OF BROOKLYN, NEW YORK.

MOVING-PICTURE MACHINE.

1,319,847.  Specification of Letters Patent. Patented Oct. 28, 1919.

Application filed January 8, 1912, Serial No. 670,104. Renewed March 14, 1919. Serial No. 282,732.

*To all whom it may concern:*

Be it known that I, JAMES A. CAMERON, a citizen of the United States, and a resident of the borough of Brooklyn, in the county of Kings, city and State of New York, have invented certain new and useful Improvements in Moving-Picture Machines, of which the following is a specification.

In the operation of the usual moving picture machine, the film is advanced past the exposure opening with an intermittent or step-by-step movement by some form of "intermittent film advancing means", and to provide sufficient slack film for this intermittent advancing means to act upon, it is customary to have a so-called "loop producing device" of some sort whose function it is to maintain a "loop" or slack piece of film at a point above or antecedent to the exposure opening. In prior machines the extent of this loop or slack piece of film is determined at the time of "threading up" or placing the film in the machine, and in such a case when once the film is in place, it is impossible to change the size or extent of the loop. The object of my present invention is to be able to adjust the size of the film loop at will.

In the carrying out of my invention, I provide a loop confining guide which is disposed at a point antecedent to the exposure opening of the machine, and a film feeding device which advances the film toward the loop-confining guide and which is spaced apart from such guide so as to cause the film to form a loop between the feeding device and the loop-confining guide, together with means for adjusting the film feeding means, independent of the means for operating the same, whereby to vary the size of the film loop to suit requirements. In a specific form the film feeding device is in the shape of a sprocket, driven by suitable gearing, and the means for adjusting the same consists of a pawl and ratchet connection between the sprocket and its driving gearing. The loop-confining guide is preferably in the form of a roll, and the same may serve the additional function of directing the film to an additional guide which is arranged adjacent to the exposure opening.

Various other features of the invention will appear as the specification proceeds.

In the drawings accompanying the specification, I have illustrated several preferred forms of the invention, but I would have it understood that changes and modifications may be made without departing from the spirit and scope of the invention.

In the drawings:

Figure 1 is a broken view showing only so much of a moving picture machine as is necessary to illustrate the application of my invention thereto.

Fig. 2 is a longitudinal sectional view of the film feeding means and adjusting means shown in Fig. 1, this view being taken on the line 2—2 of Fig. 1.

Fig. 3 is a view partly in section of the adjustable driving connection shown in the first two views. This view is taken on line 3—3 of Fig. 2.

Fig. 4 is a sectional view like Fig. 3, showing a modified form of the invention designed to permit adjustment of the film feeding device in either a forward or a rearward direction.

I have used like reference characters throughout the several views to refer to corresponding parts.

According to the preferred embodiment of the invention, the film feeding device, before alluded to, is in the form of a sprocket 1, and this sprocket, as shown in Fig. 1, is preferably spaced apart from and advances the film toward a loop-confining guide, which loop-confining guide is preferably in the shape of a roll 2. The loop-confining guide engages the same side or face of the film as that engaged by the sprocket, so that when sufficient slack film has once been provided between these two elements, the film will bow out in the form of a loop 3. In the present instance, the film passes down under the sprocket so that the sprocket engages the upper face of the film and in the same way the loop-confining guide also engages the upper face of the film, and the two parts thus act to confine the slack piece of film between them and thereby maintain said slack in the shape of a loop extending upwardly between the two elements. The sprocket may and usually does act to withdraw the film direct from the film support, but this support is not illustrated since it may be of any known type, such as a reel, etc.

The film is advanced from the loop-maintaining mechanism past a point of exposure. This so-called exposure opening is indicated at 4. The same may be provided in a plate or support 5 with which coöperates a gate 6 for holding the film flattened out across the exposure opening. The film is intermittently advanced past the exposure opening by some "intermittent film advancing mechanism". Since different types of mechanism may be used for this purpose, and as the same forms no part of the present invention, one type is illustrated more or less diagrammatically at 27. For the purpose of guiding or directing the film toward the exposure opening, there may be provided a guide in the shape of a roll 7 which is located adjacent to and at a point antecedent or prior to the exposure opening in the line of advance of the film. The loop-confining guide, which also is disposed at a point antecedent to the exposure opening, is preferably located closely adjacent to the guide roll 7, substantially as illustrated, so as to direct the film toward said guide roll. For convenience in "threading up" or placing the film in the machine, the loop-confining guide is preferably movably mounted so that it may be shifted away from the relatively fixed guide roll 7 to leave plenty of room when placing the film in position. It may, therefore, for this purpose, be mounted on a pivot 8 carried on one end of a movable support 9, which support may be mounted on a pivot 10. For the purpose of holding the film in proper engagement with the sprocket or film feeding device, a guard of some sort is usually necessary, and the same is here shown in the form of a guard roll 11. Since it is necessary to remove this guard roll from the sprocket when placing the film in position, I find it convenient to mount the guard roll on a pivot 12 carried on the opposite end of the movable support 9. By reason of this mounting, both the loop-confining guide and the guard roll may be each shifted simultaneously away from its respective guide roll and sprocket roll to permit the threading up of the film. A spring 13 or equivalent device may be employed for holding the loop-confining guide and the guard roll in normal operative position. This spring is shown in the present instance as bearing upon the extended end of the pivot 12 for the guard roll. The loop-confining roll may be of any desired construction, but it is preferably formed with end flanges to engage the edges of the film, this feature being illustrated in Fig. 1, wherein the dotted line 14 denotes the body of the roll, which it will be noted lies below the circumference of the ends of the roll. The relatively stationary guide roll 7 may also be provided with end flanges for the purpose of properly directing the film to the exposure opening.

The sprocket, or other film feeding device, as the case may be, is driven by suitable means, such as by gearing, and the same is indicated in Fig. 1 in the form of a drive gear 15 engaging with a driven gear 16 concentric with the shaft 17 on which the sprocket is mounted. Taking up now the means for securing adjustment of the sprocket independent of its driving mechanism, the same consists in a preferred form of a ratchet 18 on the end of the sprocket shaft which is engaged by a pawl or pawls 19 carried by the gear 16. A convenient way of arranging these parts is to provide the sprocket gear with a recessed or countersunk portion 20 which receives the ratchet on the end of the shaft in which the pawl or pawls are secured, substantially as indicated in Fig. 2. To prevent entrance of dirt or other foreign matter which might interfere with the proper operation of the adjustable connection between the shaft and its drive gear, I preferably provide a cover 21 which is secured to the face of the gear so as to close up the recess therein. The sprocket is fixedly engaged on its shaft as by means of a set screw 22, and for the purpose of turning the shaft, and thus the sprocket carried thereby, independent of its driving mechanism, I preferably provide a handle or finger-hold 23 on the end of the shaft opposite to that on which the ratchet is secured. With the driving and the driven gears rotating in the direction of the arrows in Fig. 1, it will be evident that the sprocket will serve to continuously advance the film toward the loop-confining guide, thereby maintaining a loop of slack film for the intermittent film advancing mechanism to act upon. In threading up the machine it is impracticable to always get just the right amount of loop, but it is possible with my device to adjust the size of the loop by turning the sprocket independent of its driving mechanism. It will be observed that the adjustable driving connection illustrated in Figs. 2 and 3 will permit of the sprocket being adjusted independent of its driving means only in one direction, in this case in a forward direction—that is to increase the size of the film loop. My invention is, however, not limited to adjusting the film loop only one way, for by means of a construction such as illustrated in Fig. 4, the sprocket may be turned either forwardly or rearwardly, and hence the film loop may be either increased or decreased at will. According to this embodiment, a "star-shaped" ratchet 24—that is one in which both sides of the teeth have substantially the same pitch, is secured on the sprocket shaft, and these double faced teeth of the ratchet are engaged by one or a number of spring-actuated pawls 25. These spring-actuated pawls may in fact each consist of a single piece of spring metal, as illustrated. It will be obvious that with this type of connection, the sprocket may be turned in either a forward or a rearward direction, so as to either throw up more loop or reduce the size of the loop.

In the case illustrated, the loop producing mechanism is located above the exposure opening, and the intermittent film advancing mechanism is located below the exposure opening. It will be obvious that the position of these parts can be reversed, and I have accordingly used the term "above" in referring to the position of the loop producing mechanism, to mean antecedent or prior to the exposure opening, in point of travel of the film. The frame 26 for supporting the various parts may be of any suitable construction.

The means for "framing", that is, registering the pictures with respect to the exposure opening is usually provided and the same is indicated in Fig. 1 as in the form of a roll 28 which when adjusted one way or the other serves to either draw down more film or to release the film to a degree whereby the film is shifted longitudinally with respect to the exposure opening. It will be evident that the adjustment of the film loop is entirely independent of the framing of the pictures.

What is claimed, is:

1. In a moving picture machine provided with an exposure opening, a loop-confining guide roll located above the exposure opening, a feed sprocket for advancing film to the loop-confining roll and spaced apart from such roll to permit the film to form a loop between the sprocket and the loop-confining roll, a shaft on which the sprocket is rigidly engaged, a finger hold on one end of the shaft for rotating the shaft to adjustably increase or diminish the film loop between the sprocket and loop-confining roll, a ratchet on the opposite end of the shaft, a gear concentric with the shaft, and a pawl carried by the gear to engage the ratchet for imparting motion to the shaft and to admit of said adjustment of the same.

2. In a moving picture machine provided with an exposure opening, a relatively stationary guide roll adjacent the exposure opening and arranged to engage the under face of the film passing to the exposure opening, a loop-confining guide roll adjacent to the first guide roll and disposed to engage the upper face of the film in its passage to the first guide roll and movably mounted with respect to the relatively stationary guide roll, a film feeding sprocket for advancing film to the loop-confining guide roll and spaced apart from the loop-confining guide roll to permit the film to form a loop between the sprocket and loop-confining guide roll, means for continuously driving the sprocket during the operation of the machine, and means for adjusting the sprocket rotatively independent of the driving means for the purpose of increasing or decreasing the size of the film loop between the sprocket and loop-confining guide roll.

3. In a moving picture machine provided with an exposure opening, a film guide for directing the film toward the exposure opening, a film feeding sprocket, a movable supporting member, a guard supported on one end of the movable supporting member for holding the film in engagement with the sprocket, a loop-confining guide supported on the opposite end of the supporting member for directing the film toward the film guide, driving means for the sprocket, and means for adjusting the sprocket forwardly or rearwardly independent of the driving means for the purpose of varying the size of the film loop between the sprocket and loop-confining guide.

4. In a moving picture machine, a frame, a shaft journaled on said frame, a film feeding roll fast on said shaft, a driven gear loosely engaged on one end of the shaft, a driving gear meshing with the said driven gear, and adjustable connection between the driven gear and shaft for imparting motion to the shaft and permitting the shaft to be adjustably rotated at will in either direction, comprising a ratchet carried by one of said members and a pawl carried by the other of said members for engagement with the teeth of the ratchet.

5. In a moving picture machine, a frame, a shaft journaled on said frame, a film feeding roll fast on said shaft, a driven gear loosely engaged on one end of the shaft and provided with an annular recess therein, a driving gear meshing with the driven gear, a ratchet on the end of the shaft received within the annular recess in the driven gear, and a pawl secured within the said recess of the driven gear and engaging the teeth of the ratchet.

6. In a moving picture machine, a frame, a shaft journaled on said frame, a film feeding roll fast on the shaft, a handle on one end of the shaft for rotatably adjusting the same, a driven gear loosely engaged on the opposite end of the shaft, and provided with an annular recess therein, a pawl located in the recess of the gear, and a ratchet fast on the shaft received within the recess in the gear so as to be engaged by the pawl for driving said shaft from the driven gear and permitting the shaft to be adjusted forwardly or rearwardly by said handle at will.

7. In a moving picture machine, a frame, a shaft journaled on said frame, a film feeding roll fast on the shaft, a handle on one end of the shaft for rotatively adjusting the same, a driven gear loosely engaged on the opposite end of the shaft and provided with an annular recess therein, a pawl located in the recess of the gear, a ratchet fast on the shaft received within the recess in the gear so as to be engaged by the pawl, and a closure for the annular recess in the face of the gear.

Signed at New York city, in the county of New York and State of New York, this 26th day of December, A. D. 1911.

JAMES A. CAMERON.

Witnesses:
AXEL V. BEEKEN,
LAURA E. SMITH.